(12) United States Patent
Ishii et al.

(10) Patent No.: US 10,817,298 B2
(45) Date of Patent: Oct. 27, 2020

(54) SHORTCUT PATH FOR A BRANCH TARGET BUFFER

(71) Applicant: ARM LIMITED, Cambridge (GB)

(72) Inventors: Yasuo Ishii, Austin, TX (US); Michael Filippo, Driftwood, TX (US); Muhammad Umar Farooq, Austin, TX (US)

(73) Assignee: ARM Limited, Cambridge (GB)

( * ) Notice: Subject to any disclaimer, the term of this patent is extended or adjusted under 35 U.S.C. 154(b) by 319 days.

(21) Appl. No.: 15/335,741

(22) Filed: Oct. 27, 2016

(65) Prior Publication Data
US 2018/0121203 A1    May 3, 2018

(51) Int. Cl.
*G06F 9/38* (2018.01)

(52) U.S. Cl.
CPC .................................. *G06F 9/3806* (2013.01)

(58) Field of Classification Search
CPC .............................. G06F 9/3806; G06F 9/3844
See application file for complete search history.

(56) References Cited

U.S. PATENT DOCUMENTS

| | | | | |
|---|---|---|---|---|
| 5,842,008 A * | 11/1998 | Gochman | ............. | G06F 9/3806 712/240 |
| 6,307,855 B1 * | 10/2001 | Hariguchi | ............. | G11C 15/04 370/392 |
| 7,082,520 B2 * | 7/2006 | Bonanno | ............. | G06F 9/3806 712/236 |
| 2005/0149708 A1 * | 7/2005 | Gat | ........................ | G06F 9/3806 712/239 |
| 2013/0339695 A1 * | 12/2013 | Bonanno | ............. | G06F 9/30145 712/239 |

* cited by examiner

*Primary Examiner* — Aimee Li
*Assistant Examiner* — Kasim Alli
(74) *Attorney, Agent, or Firm* — Nixon & Vanderhye P.C.

(57) ABSTRACT

An apparatus comprises a branch target buffer (BTB) to store predicted target addresses of branch instructions. In response to a fetch block address identifying a fetch block comprising two or more program instructions, the BTB performs a lookup to identify whether it stores one or more predicted target addresses for one or more branch instructions in the fetch block. When the BTB is identified in the lookup as storing predicted target addresses for more than one branch instruction in said fetch block, branch target selecting circuitry selects a next fetch block address from among the multiple predicted target addresses returned in the lookup. A shortcut path bypassing the branch target selecting circuitry is provided to forward a predicted target address identified in the lookup as the next fetch block address when a predetermined condition is satisfied.

17 Claims, 7 Drawing Sheets

SHORTCUT PATH FOR A BRANCH TARGET BUFFER

BACKGROUND

Technical Field

The present technique relates to the field of data processing.

Technical Background

A data processing apparatus may have a branch predictor for predicting the outcomes of branch instructions before those instructions have actually been executed. This can help to improve performance by allowing instructions subsequent to the branch to be fetched before the outcome of the branch is known. A branch predictor may include a branch target buffer for predicting the target address of the branch, which represents the address of the next instruction to be fetched after a taken branch.

SUMMARY

At least some examples provide an apparatus comprising:
a branch target buffer to store predicted target addresses of branch instructions, wherein in response to a fetch block address identifying a fetch block comprising a plurality of program instructions, the branch target buffer is configured to perform a lookup to identify whether the branch target buffer stores one or more predicted target addresses for one or more branch instructions in said fetch block;
branch target selecting circuitry to select, when the branch target buffer is identified in the lookup as storing a plurality of predicted target addresses for a plurality of branch instructions in said fetch block, a next fetch block address from among said plurality of predicted target addresses; and
a shortcut path bypassing the branch target selecting circuitry, to forward a predicted target address identified in the lookup as said next fetch block address when a predetermined condition is satisfied.

At least some examples provide an apparatus comprising:
means for storing predicted target addresses of branch instructions, wherein in response to a fetch block address identifying a fetch block comprising a plurality of program instructions, the means for storing is configured to perform a lookup to identify whether the means for storing stores one or more predicted target addresses for one or more branch instructions in said fetch block;
means for selecting, when the means for storing is identified in the lookup as storing a plurality of predicted target addresses for a plurality of branch instructions in said fetch block, a next fetch block address from among said plurality of predicted target addresses; and
means for bypassing the branch target selecting circuitry, to forward a predicted target address identified in the lookup as said next fetch block address when a predetermined condition is satisfied.

At least some examples provide a method comprising:
in response to a fetch block address identifying a fetch block comprising a plurality of program instructions, looking up a branch target buffer to identify whether the branch target buffer stores one or more predicted target addresses for one or more branch instructions in said fetch block;
when the branch target buffer is identified in the lookup as storing a plurality of predicted target addresses for a plural-ity of branch instructions in said fetch block, selecting a next fetch block address from among said plurality of predicted target addresses; and
when a predetermined condition is satisfied, bypassing said selecting to forward a predicted target address identified in the lookup as said next fetch block address.

Further aspects, features and advantages of the present technique will be apparent from the following description of examples, which is to be read in conjunction with the accompanying drawings.

DESCRIPTION OF EXAMPLES

Some specific examples are described below. It will be appreciated that the invention is not limited to these exact examples.

A branch target buffer (BTB), which can also be referred to as a branch target address cache (BTAC), stores predicted target addresses for a number of branch instructions. In response to a fetch block address identifying a fetch block comprising two or more program instructions, the branch target buffer performs a lookup to identify whether it stores one or more predicted target addresses for one or more branch instructions in the fetch block. When there is a hit in the BTB (when the BTB does store a predicted target address for the fetch block), the predicted target address returned in the lookup is used as a prediction of the next fetch block address, which represents the next block of instructions to be fetched from an instruction cache after the block represented by the current fetch address in the event that the branch is predicted taken (e.g. a separate branch direction predictor may predict whether the branch is taken or not). The next fetch block address can also be used for a subsequent lookup of the BTB in a following cycle.

Hence, the BTB can perform a single lookup for a fetch block comprising multiple instructions, which can help improve instruction throughput compared to looking up each instruction individually. This can be particularly useful for superscalar processors. However, some fetch blocks may include more than one branch. While some implementations may limit the BTB to storing information about a single branch per fetch block, in this case the BTB cannot provide a prediction about a second branch or further branches within the fetch block, and so if the first branch in the fetch block is predicted not taken the BTB cannot predict a target address for any further branch in the same fetch block which might still be taken. Therefore, restricting the BTB to returning a single target address per fetch block can increase the chance that the next fetch block address is mispredicted, which can affect performance.

Branch prediction coverage can be improved by using a BTB which can store multiple target addresses for the same fetch block, which can increase the percentage of branches which are correctly predicted, improving performance and reducing power consumption by reducing the number of incorrectly fetched instructions. As the BTB may generate multiple hits for a given fetch block address, branch target selecting circuitry may be provided to select the next fetch block address from among two or more predicted target addresses returned by the lookup. For example, the branch target selecting circuitry may identify which of the branches for which hits are detected in the BTB relates to the earliest taken branch, and use that branch's predicted target address as the next fetch block address. However, such an operation takes some time, as it may need to consider other information such as the addresses of the branches for which a hit was detected and whether or not each of those branches is predicted taken. Therefore, the branch target selecting operation may increase branch prediction latency.

The inventors recognised that in practice, while a non-negligible number of fetch blocks do contain two or more branches, and so the performance benefits of allowing multiple hits per fetch block and providing the branch target selecting circuitry are justified, in practice the majority of fetch blocks contain either zero branches or one branch in which case the branch target selecting circuitry would not be needed. Therefore, a shortcut path can be provided to bypass the branch target selecting circuitry, to forward a predicted target address identified in the lookup as the next fetch block address when a predetermined condition is satisfied. By allowing the branch target selection circuitry to be bypassed by the shortcut path, the next fetch block address can often be identified earlier, saving at least one cycle. By reducing the branch target address prediction latency, performance can be improved and power consumption reduced.

The shortcut path is particularly useful for a BTB which has an N-way set-associative structure. A set-associative structure is useful for storing and matching against multiple branches in the same fetch block because N ways of storage circuitry can be looked up in parallel, indexed by the fetch block address, to identify predicted target addresses for up to N branch instructions within the fetch block. The number of ways N can vary from implementation to implementation, but N=2, 3 or 4 may often be sufficient, depending on the trade off between performance and power consumption required for a given system implementation. In some examples the BTB may comprise SRAM-based storage.

When selecting the next fetch block address, the branch target selecting circuitry may select the predicted target address which corresponds to the earliest predicted taken branch instruction among the multiple branches identified in the fetch block. The "earliest" predicted taken branch in a given fetch block may be the predicted taken branch having the lowest instruction address. If the branch taken prediction is correct, branches which occur after the earliest predicted taken branch will not be encountered as program execution would already have been redirected before reaching those branches, so the predicted target addresses for later branches can be ignored and the predicted target address of the earliest predicted taken branch can be used as the next fetch block address.

The apparatus may have control circuitry for determining whether the predetermined condition is satisfied, and hence whether the next fetch block address from the shortcut path can be used. The control circuitry may control which address is used as the next fetch block address by the BTB for a subsequent lookup of the BTB, depending on whether the predetermined condition is satisfied (the selected next fetch block address may also be supplied to a fetch stage to control fetching of program instructions from an instruction cache). When the predetermined condition is satisfied, the next fetch block address from the shortcut path is used. When the predetermined condition is failed, the next fetch block address from the branch target selecting circuitry is used.

In one example the control circuitry may comprise onehot detection circuitry to detect whether the branch target buffer is identified in the lookup as storing only one predicted target address for the fetch block (such an occurrence may be referred to as a 'onehot' condition—indicating that there was exactly one hit in the BTB for the current fetch block). Hence, whether the predetermined condition is satisfied may depend on whether the onehot condition is detected. The shortcut path may determine the next fetch block address using a combination of logic gates which enables a faster prediction of the next fetch block address to be generated than is possible using the branch prediction circuitry, which is reliable in the case when there is only one hit in the BTB, but may generate a corrupt prediction in the case when there are multiple hits in the BTB for the same fetch block. Hence, by determining whether the predetermined condition is satisfied in dependence on the output of the onehot detection circuitry, the control circuitry can determine whether it is safe to use the output of the shortcut path, or whether it is better to wait for the result of the branch target selecting circuitry.

Alternatively, the control circuitry may not need to include onehot detection circuitry itself. In some cases the control circuitry could detect whether a given fetch block includes exactly one branch or includes multiple branches based on information provided by another part of the data processing pipeline. For example, detection of the number of branches in a given fetch block could be performed at the decode stage of a pipeline, and some information specifying whether a fetch block comprises exactly one branch can then be fed back to the branch predictor, which can maintain such information in the BTB or in a separate storage structure. Hence, in some cases the control circuitry could detect whether the predetermined condition is satisfied based on information stored in the BTB itself or in the separate structure, rather than actually detecting the number of hits using onehot detection circuitry.

Either way, whether the predetermined condition is satisfied may depend on whether the BTB is identified as storing only one predicted target address for the looked up fetch block. In cases other than when the BTB is identified as storing only one predicted target address for the fetch block, the control circuitry may determine that the predetermined condition is failed, and so the next fetch cycle should use the predicted target address from the branch target selecting circuitry.

In some embodiments the predetermined condition may be determined to be passed in cases when the BTB is identified as storing only one predicted target address for the fetch block.

However, other embodiments may also provide some other criteria which may affect whether the predetermined condition is passed or failed. There may be one or more exceptions to the general rule that the shortcut path can be used when only one hit in the BTB is identified. In such embodiments, although the predetermined condition cannot pass unless the onehot condition is identified, detecting the onehot condition does not guarantee that the predetermined condition is passed as there may be some other occurrence which indicates it is preferable not to use the shortcut path.

For example, the control circuitry may consider how much spare capacity remains available in at least one branch prediction resource. For example, the branch predictor may have a number of branch prediction resources which may have finite space available for accommodating branch information or fetch addresses. One example of such a branch prediction resource may be a fetch queue which queues fetch block addresses of blocks of program instructions to be fetched from an instruction cache, while waiting for the instruction cache to have enough bandwidth available for actually fetching those blocks of instructions. The fetch queue may have a finite number of entries and if the fetch queue becomes full or almost full it may not be able accept further addresses and so the branch predictor may stall.

Another example of a branch prediction resource may be a return address predictor for predicting return addresses of function calls. A function call is a piece of code which can be called from another location in the program, and executes some functionality before branching back to the point of the program from which the function was called. The same function can be called from a number of different locations within the program and so the return address to which processing should branch on completion of the function can be different for different instances of calling the same function. This makes the return address relatively difficult to predict using the regular BTB. Hence, some branch prediction implementations may provide a separate return address predictor which can track information such as the function call history which led to calling of a given function and/or the past pattern of return addresses encountered for the same function, in order to provide a more reliable prediction of the function return address. Again, the return address predictor may have a finite number of entries available, and so if it is full or almost full, it may not be able to accept further information for a time, which can stall the branch prediction pipeline.

If branch prediction resource is running out, it may actually be counterproductive to perform the target address prediction faster, since taking longer over the target address prediction could give more time for another branch prediction resource to gain more capacity, reducing the chance of a stall of the branch predictor as a whole. As the performance penalty if a stall occurs may be greater than the additional time to select the next fetch block address using the branch target selecting circuitry instead of the shortcut path, it may be preferable not to use the shortcut path when a certain branch prediction resource is scarce.

Therefore, in some implementations the control circuitry may determine that the predetermined condition is failed when a spare capacity of at least one branch prediction resource is less than or equal to a threshold amount. For example a branch prediction resource, such as the fetch queue or the return address predictor, may provide a signal to the control circuitry indicating whether its spare capacity is less than or equal to a given threshold (the threshold could be zero or non-zero), and when low resource is detected then the predetermined condition may be determined to be failed. This means the shortcut path is not used, with the extra time taken to perform the full analysis using the branch target selecting circuitry giving more time for additional resource to become available, reducing the chance of a stall and hence improving performance.

Another exception to using the shortcut path in the onehot case may be that certain types of branch instruction may be better handled using the full branch target selecting circuitry. Some types of branch may be harder to predict than others. The shortcut path may have relatively simple logic for selecting the predicted target address, which can be appropriate for some branches, but for other types of branch the prediction accuracy may be higher if the branch target selecting circuitry or another branch prediction mechanism is used, and so giving more time for the slower prediction to become available by not using the shortcut can be beneficial. Hence, the control circuitry may identify, in the case of a hit in the BTB, whether the branch corresponding to a given predicted target address identified in the lookup is a predetermined type of branch instruction, and if there is a target address which corresponds to the predetermined type of branch instruction, then the predetermined condition may be failed. For example the BTB may store type identifying information in association with each predicted target address, which specifies whether the corresponding branch is the predetermined type of branch instruction. That is, the type information may indicate whether the shortcut path is available or not for certain target addresses in the event of a hit in the BTB on that address.

One example of a type of branch instruction for which this approach can be useful is a polymorphic branch instruction for which two or more different branch addresses have previously been identified as the target of the same branch. Some branches have target addresses which remain relatively static from instance to instance when the branch is executed. However, polymorphic branches may exhibit more variation in the target address, e.g. because the target address is data-dependent, depending on the outcome of other instructions.

Some branch prediction implementations may provide a separate polymorphic predicting structure for tracking the different target addresses detected for the same branch and some indication of the circumstances in which those target addresses were encountered (e.g. function call histories, or fetch address patterns), to give a prediction of the most likely target address the next time the same polymorphic branch is encountered. However, such polymorphic branch prediction may be more complex and may require a greater number of cycles than would be available if the shortcut path was used to forward the next fetch block address. Therefore, when a polymorphic branch is identified by the BTB then the shortcut path may be deactivated and instead the branch target selecting circuitry can be used to give more time for the outcome of the polymorphic branch to be predicted.

A similar type-specific selection of whether the shortcut path can be used could also be used for other types of branch, other than polymorphic branches. Some type information can be stored in the BTB alongside the predicted target addresses to control whether the shortcut path can be used for a given branch.

Another reason why the predetermined condition may fail may be that the BTB may not be the only branch target predictor provided. There may be at least one further branch target predictor which also provides a predicted target address in response to the fetch block address, but uses a different prediction mechanism or provides a different level of prediction coverage, performance or latency. For example, the further branch target predictor may be a micro-predictor which provides a faster prediction of the predicted target address than the BTB, but provides predicted target addresses for fewer branch instructions than the BTB. Providing a smaller/faster predictor in addition to a larger/slower predictor can help to provide a better balance between performance and power consumption than a single larger predictor.

However, when at least one further branch target predictor is provided then sometimes the same fetch block address may hit both in the BTB and in the further branch target predictor, in which case some comparison or sorting logic may need to decide which of the predictions should be used. This logic may take some time and so again using the shortcut path in the BTB may not be appropriate if its outcome still has to be qualified by the comparison with another predictor anyway. Hence, the control circuitry may determine that the predetermined condition is failed when a hit is detected in at least one further branch predictor (that is the further predictor detects a predicted target address in response to the fetch block address).

In summary, in some implementations the predetermined condition may be determined to be passed when (a) the fetch block is identified to include only one branch, and (b) one or more exception occurrences have not arisen (e.g. the exception occurrences could include low prediction resource remaining, the detection of a predetermined type of branch, and/or a hit in another predictor as discussed above).

In general, when the predetermined condition is satisfied then the BTB may perform a next lookup of the BTB at least one processing cycle earlier than when the condition is failed. In some implementations, if the predetermined condition can be resolved fast enough then its outcome may be available by the time the next fetch block address is available on the shortcut path.

However, especially if there are a number of different criteria to check, resolving the predetermined condition may take some time and waiting for this to actually be determined may take longer than forwarding of the next fetch block address over the shortcut path. Therefore, to improve performance the BTB may speculatively perform a next lookup using the next fetch block address provided by the shortcut path before the control circuitry has actually determined whether the predetermined condition was satisfied for the previous lookup. If it turns out that the predetermined condition was satisfied then performing the next lookup earlier improves performance. On occasions when it turns out that the predetermined condition was failed in the previous lookup, the control circuitry can control the BTB to discard any results of the speculatively performed lookup and restart the next lookup using the next fetch block address provided by the branch target selecting circuitry.

The shortcut path may have some logic for selecting which target address to output over the shortcut path. This logic may be less complex than the logic included in the branch target selecting circuitry since the shortcut path may not need to consider other information such as the taken predictions for any hit branches or the instruction addresses of the branches corresponding to the identified predicted target addresses. For example the shortcut path logic may comprise a plurality of AND gates to AND each predicted target address identified by the branch target buffer in the lookup with a respective taken signal indicating whether the corresponding branch instruction is predicted taken, and one or more OR gates to combine outputs of the plurality of AND gates in a logical OR operation, and the shortcut path may forward an output of the one or more OR gates as said next fetch block address. With this approach, in cases when there is only one address which hits against the fetch block address, the output of the OR gates will be correct as it is the predicted target address of the only branch identified in the fetch block. In cases when two or more addresses match the fetch block address in the lookup, the output of the OR gates will be unpredictable, but in this case the control circuitry can control the BTB to restart any next lookup using the next fetch block address provided by the branch target selecting circuitry to prevent the potentially corrupt value provided over the shortcut path affecting future fetch operations.

Figure 1:
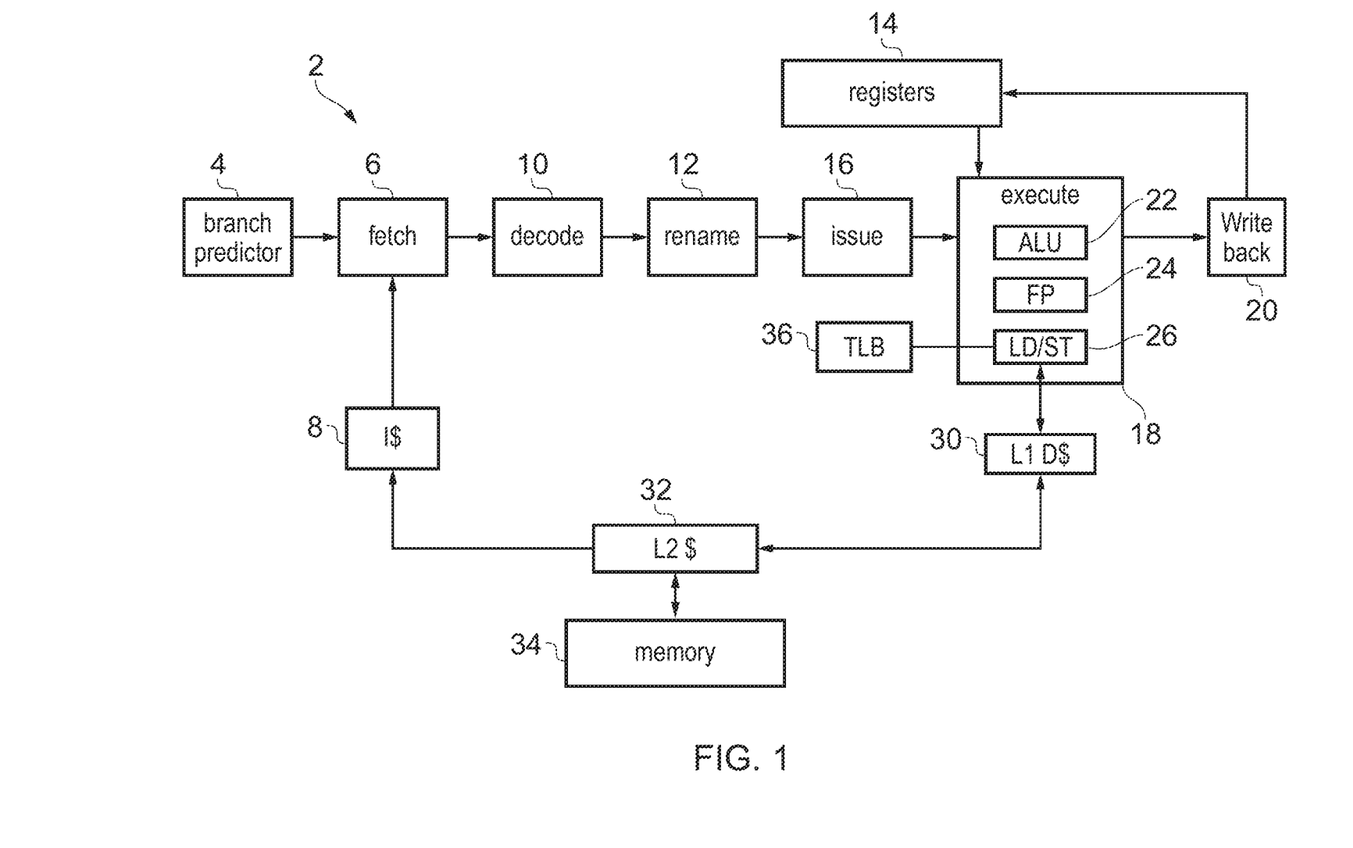
FIG. 1 schematically illustrates an example of a data processing apparatus having a branch predictor.

FIG. 1 schematically illustrates an example of a data processing apparatus 2 having a processing pipeline comprising a number of pipeline stages. The pipeline includes a branch predictor 4 for predicting outcomes of branch instructions and generating a series of fetch addresses of blocks of instructions to be fetched. A fetch stage 6 fetches the blocks of instructions identified by the fetch addresses from an instruction cache 8. A decode stage 10 decodes the fetched instructions to generate control information for controlling the subsequent stages of the pipeline. A rename stage 12 performs register renaming to map architectural register specifiers identified by the instructions to physical register specifiers identifying registers 14 provided in hardware. Register renaming can be useful for supporting out-of-order execution as this can allow hazards between instructions specifying the same architectural register to be eliminated by mapping them to different physical registers in the hardware register file, to increase the likelihood that the instructions can be executed in a different order from their program order in which they were fetched from the cache 8, which can improve performance by allowing a later instruction to execute while an earlier instruction is waiting for an operand to become available. An issue stage 16 queues instructions awaiting execution until the required operands for processing those instructions are available in the registers 14. An execute stage 18 executes the instructions to carry out corresponding processing operations. A writeback stage 20 writes results of the executed instructions back to the registers 14.

The execute stage 18 may include a number of execution units such as an ALU (arithmetic logic unit) 22 for performing arithmetic or logical operations, a floating-point unit 24 for performing operations using floating-point operands and a load/store unit 26 for performing load operations to load data from a memory system to the registers 14 or store operations to store data from the registers 14 to the memory system. In this example the memory system includes the instruction cache 8, a level one data cache 30, a level two cache 32 which is shared between data and instructions, and main memory 34, but it will be appreciated that this is just one example of a possible memory hierarchy and other implementations can have further levels of cache or a different arrangement. The load/store unit 26 may use a translation lookaside buffer 36 to map virtual addresses generated by the pipeline to physical addresses identifying locations within the memory system. It will be appreciated that the pipeline shown in FIG. 1 is just one example and other examples may have different sets of pipeline stages or execution units. For example, an in-order processor may not have a rename stage 12.

Figure 2:
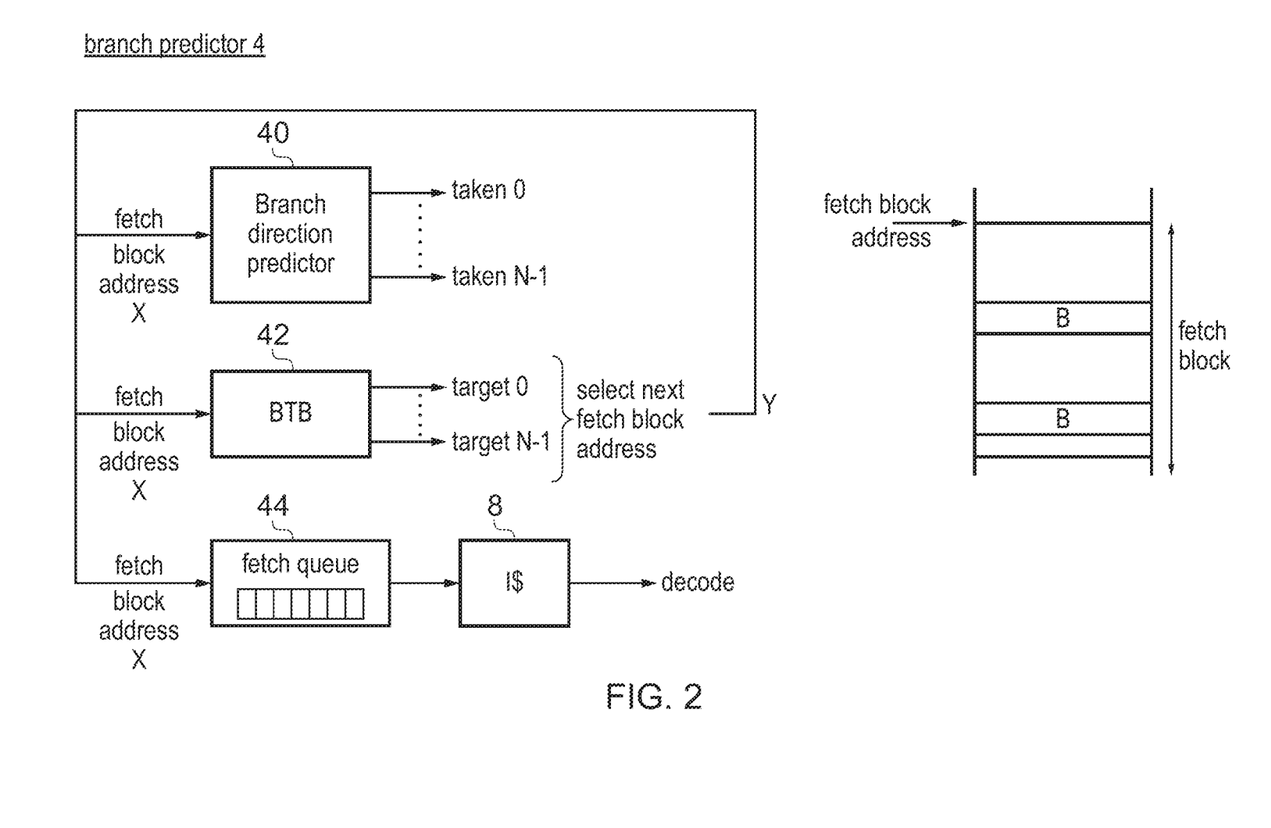
FIG. 2 illustrates the branch predictor in more detail.

FIG. 2 schematically illustrates a portion of the branch predictor 4, which includes a branch direction predictor (BDP) 40 for predicting whether branch instructions are taken or not taken, a branch target buffer (BTB) 42 for predicting the target address to which a branch instruction will redirect program execution in the event that it is taken, and a fetch queue 44 for queueing the fetch addresses identifying blocks of program instructions to be fetched from the cache 8 (note that in some cases the fetch queue could be regarded as part of the fetch stage 6 instead of part of the branch predictor 4, but the functionality would be the same). The addresses placed in the fetch queue 44 represent addresses of blocks of instructions to be fetched from the instruction cache 6, which are derived from previous predictions of the branch predictor. The unit of instructions fetched in one block from the cache 6 may be referred to as a "fetch block" and may have a certain default size, e.g. 16, 32 or 64 bytes, although in some cases when the start address from which fetching is to be performed is not aligned with a natural fetch block boundary, a fetch of a partial fetch block may be performed with a size less than the default size.

The BDP 40, which can also be referred to as a branch history buffer or branch outcome predictor, records branch history information for predicting the outcome of branch instructions. Any known branch taken/not taken prediction scheme may be used for the BDP 40. For example, gshare or TAGE are examples of known branch direction prediction algorithms.

The BTB 42 holds prediction information for a number of branch instructions, identified by a tag corresponding to a portion of the instruction address for the branch instruction. The prediction information may include the target address for the branch, as well as other information such as the instruction address (program counter or PC) of the corresponding branch instruction, some attributes concerning the branch (e.g. whether it is indirect, unconditional, function call, function return, . . . ), or other information for predicting the outcome of the branch as will be described below.

When the instruction fetch unit 6 starts a new fetch for a given fetch block address PC=X, the branch predictor 4 also looks up PC=X in the BTB 42 and BDP 40. When BTB 42 has prediction information about PC=X, its information is read out from the BTB. When the BTB 42 detects branch information, its information is qualified by the BDP 40. When the branch is predicted taken by the BDP 40, a target address (Y) stored in the corresponding BTB entry is feedback as the next fetch block address. In general, the instruction fetch unit performs sequential fetch until a predicted taken branch is detected from branch predictor. These sequentially fetched data are discarded when a predicted taken branch is detected in the branch predictor. Hence, when the instruction fetch unit start fetch for address X, sequential addresses (X+1, X+2) will be accessed in subsequent cycles. If the branch prediction consumes 2 cycles to make the prediction for address X and then predicts that the next fetch block address is Y for a taken branch, fetch transactions X+1 and X+2 should be discarded. This can waste not only branch predictor power, but also instruction cache lookup power because they may sync with each other. An example of this is shown in the following table:

| Stage 0 | X | X + 1 | X + 2 | Y | Y + 1 | Y + 2 |
|---|---|---|---|---|---|---|
| Stage 1 | | X | X + 1 | | Y | Y + 1 |
| Stage 2 | | | X | | | Y |

The branch prediction result is available in the end of stage 2. Then, the restarted address Y is feedback to stage 0 after X reaches stage 2. In this case, in-flight fetches for X+1 and X+2 are discarded when the fetch for address Y is started.

On the other hand, if the number of cycles taken to obtain the branch prediction result could be reduced to one cycle, fewer unnecessary fetches would be initiated and the correct fetches can be initiated sooner, saving power and improving performance:

| Stage 0 | X | X + 1 | Y | Y + 1 |
|---|---|---|---|---|
| Stage 1 | | X | | Y |

Figure 3:
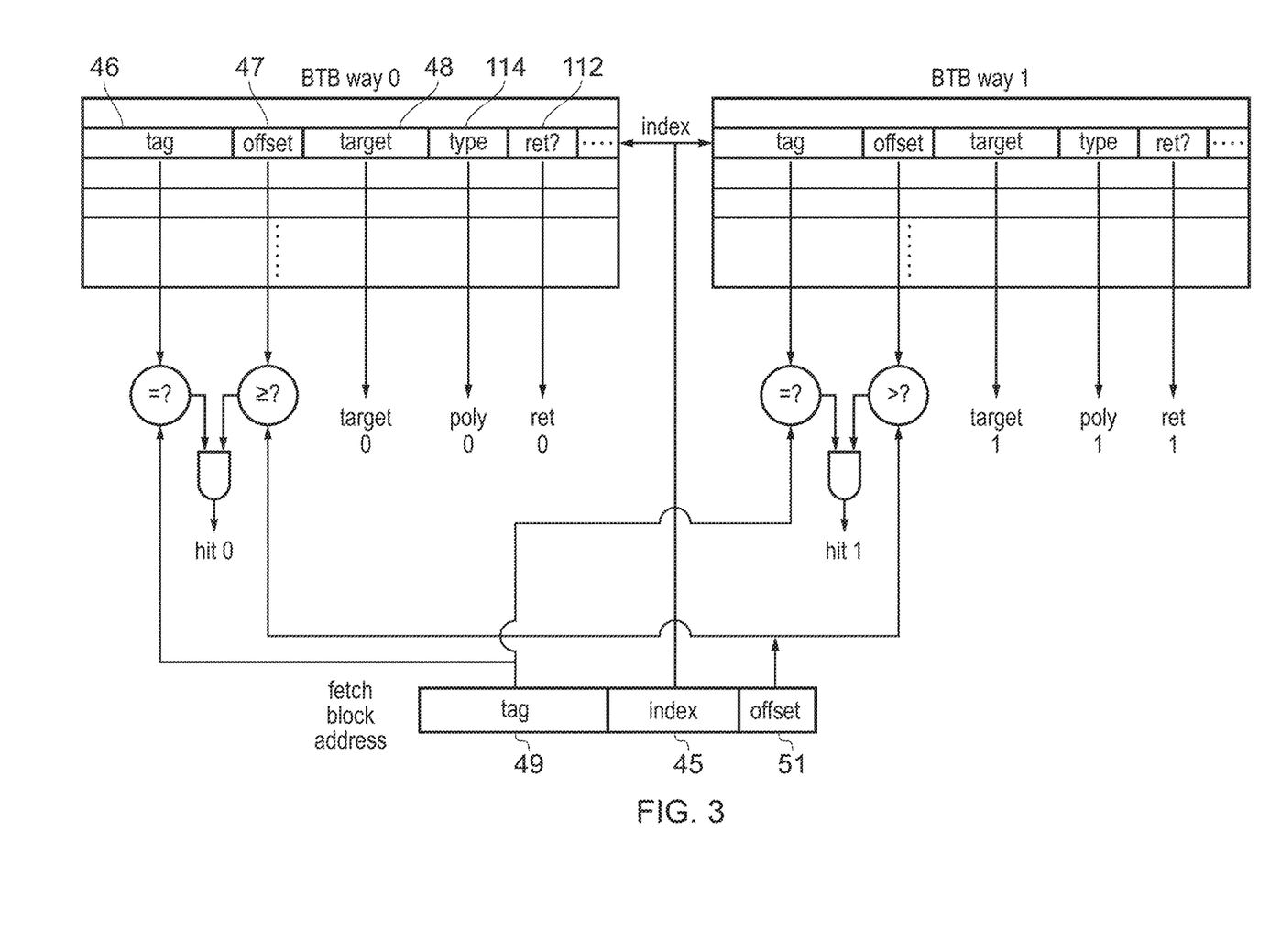
FIG. 3 illustrates an example of a branch target buffer with a set-associative structure.

The BTB 42 has a cache-like data structure. The BTB storage is implemented using SRAM (static random access memory) because it needs to hold information for many branches to provide a sufficient branch prediction rate. As shown in FIG. 3, the BTB may have an N-way set-associative structure, comprising N ways of storage circuitry each comprising a number of entries. In this example N=2, but other examples could have N=3 or 4 or greater. Each entry has a tag 46 and branch information. In this example, the branch information includes:

- an offset value 47 representing a number of least significant bits of the instruction address (PC) of the corresponding branch instruction (the offset represents the position of the branch within a fetch block, relative to the fetch block address);
- the predicted target address 48 of the branch;
- a branch type indicator 114 indicating the type of branch (e.g. whether the branch is a polymorphic branch, indirect branch, unconditional branch, function call, function return, etc.); and
- a function return indicator 112 indicating whether the branch corresponds to a function return (in other examples this could be combined with the branch type indicator).

It will be appreciated that other examples could store other types of information about the corresponding branches.

The BTB is indexed by an index portion 45 of instruction address (or a hash of the index portion 45). When branch information is allocated to the BTB for a given fetch block of program instructions, the branch information for corresponding branches in that fetch block is allocated to any of the entries in the corresponding set of locations selected using the index portion 45 (with the set comprising one entry in each way). Some fetch blocks include multiple branches (as shown in the right hand part of FIG. 2), and in this case multiple entries in different ways may be populated with branch information for the same fetch block. Other fetch blocks may have only a single branch, and in this case only one of the entries of a given set may be populated with branch information for that fetch block, so that it is possible that the set of locations corresponding to a given index ends up containing branch information for branches in different fetch blocks.

When looking up the BTB for a given fetch block address, all the entries in the set of locations identified by the index portion 45 are read and their branch information returned. The tag value 46 is compared with a tag portion 49 of the fetch block address, and also the offset value 47 is compared with an offset portion 51 of the fetch block address. A hit is detected in a given way of the BTB 42 if the tag value 46 of that entry equals the tag portion 49 of the fetch block address and the offset value 47 in that entry is greater than or equal to the offset portion 51 of the fetch block address (comparing the offset values in this way guards against generating a hit on an entry which relates to a branch which actually occurs before the start of the corresponding fetch block). The branch information 47, 48, 114, 112 read from each entry is treated as valid when a hit is detected.

Referring to FIG. 2, when hits are detected in more than one way for a given fetch block address, the earliest predicted taken branch (the predicted taken branch having the lowest address) is selected, and its target address is fed back for the next fetch. The earliest predicted taken branch is used because the instructions which are located behind the earliest predicted taken branch will not be executed in the pipeline if the branch direction prediction is correct. The earliest predicted taken branch can be identified using the offset values 47 stored in the entries for which a hit was detected and the corresponding taken/not-taken predictions from the BDP 40. However, for high clock frequency superscalar processor cores, this operation cannot be performed in one cycle.

In practice, in a typical superscalar processor core using a fetch block size of 32 bytes, for example, a non-negligible percentage of fetch blocks have multiple branches. For example, for some typical processing benchmarks it has been found that around 30% of fetch blocks have no branch, 40% have 1 branch, and around 30% have multiple branches. Hence, the capability of predicting multiple branches in same fetch block is useful for the cases when there are multiple branches, which occurs sufficiently frequently to justify the additional delay and power consumption associated with selecting between the multiple predicted target addresses.

However, we can also see that more fetch blocks have only one branch. If a smaller fetch block size than 32-bytes is used, the percentage of fetch blocks having only one branch will be even higher. Therefore, there are a significant number of fetch cycles when the step of searching for the earliest predicted taken branch in order to select the corresponding target address is not necessary. Thus, this operation can be skipped when only one branch is present in the fetch block.

Figure 4:
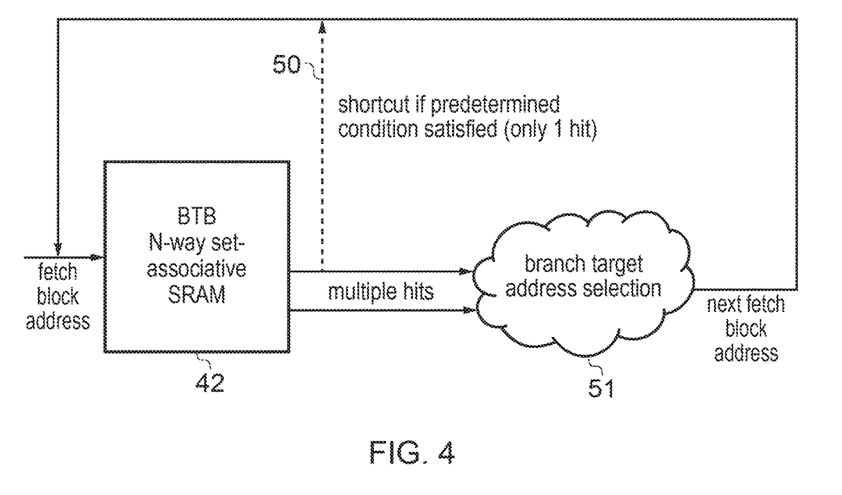
FIG. 4 schematically illustrates a branch target buffer having a shortcut path for bypassing branch target selecting the circuitry.

Therefore, as shown in FIG. 4, when the BTB 42 generates multiple hits for a given fetch block address, the branch target address selecting circuitry 51 determines which of the addresses relates to the earliest predicted taken branch and hence should be output as the next fetch block address. However, an additional shortcut path 50 is also provided to bypass the branch target address selecting circuitry 51. In the case when a predetermined condition is satisfied (when there is only one address which hit against the fetch block address in the BTB lookup), the shortcut 50 can be taken to save a time, so that the next lookup of the BTB 42 can occur at least one cycle earlier.

Figure 5:
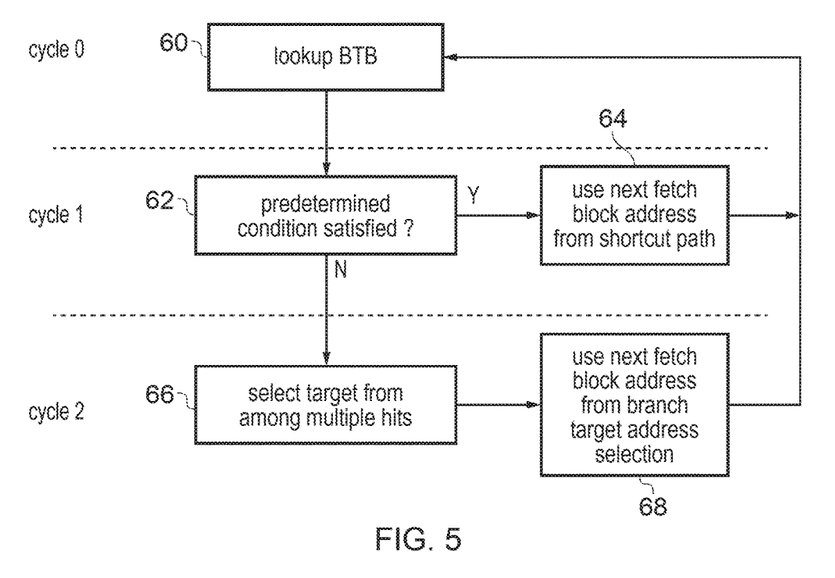
FIG. 5 is a flow diagram illustrating a method of predicting a branch target address.

FIG. 5 is a flow diagram illustrating the method of predicting the branch target address using the BTB. At step 60 a lookup of the BTB 42 is performed based on a fetch block address which identifies a block of program instructions to be fetched from the instruction cache 8. The BTB looks up each of the ways of the set-associative structure, and each way returns a hit signal indicating whether that way stored a predicted target address for the fetch block. The BTB also returns the prediction information for that entry, including the offset 47, target address 48 and other information described above with respect to FIG. 3.

At step 62, control circuitry associated with the BTB determines whether a predetermined condition satisfied. The condition may be satisfied if only one hit was identified by the BTB and no other occurrence arises which would prevent the shortcut path being used. If the predetermined condition is satisfied, then at step 64 the next fetch block address from the shortcut path is used for the next fetch cycle. The shortcut path may AND each predicted target address returned by the BTB with the corresponding hit signal and the taken signal from the branch direction predictor 40, and then OR altogether all the respective AND results to generate the fetch block address from the shortcut path. This is a faster way of generating the next fetch block address in cases when there is only one hit, but the result may be corrupted or uncertain in cases when there are multiple hits. Hence, if the predetermined condition is satisfied it is safe to use the value from the shortcut path and so by returning this in cycle 1 as shown in FIG. 5, when the method returns to step 60 the next lookup can be performed one cycle earlier than if the full target address selection circuitry 51 was used.

On the other hand, if at step 62 it is determined that the predetermined condition is not satisfied then at step 66 the branch target address selection circuitry 51 selects which target address is to be used when there are multiple hits in the BTB 42. For example the branch target address selection circuitry 51 may compare the offsets 47 returned by the BTB for each of the hits to check which branch has the lowest address and so appears earliest in the fetch block. The target address of the earliest predicted taken branch can then be used at step 68 as the next fetch block address. The method then returns again to step 60 but this time the next lookup is triggered one cycle later than in the case when the predetermined condition was met.

When a fetch block does not generate any hits in the BTB (i.e. no branches are identified), then it does not matter which of the shortcut path 50 and branch target address selecting circuitry 51 is selected, since in this case there would be no taken signals generated by the BDP 40 and so the next fetch block address output by the shortcut path 50 or the branch target address selecting circuitry 51 would not be used anyway. Instead, fetching would continue sequentially and so the next fetch block address may be derived by incrementing the previous fetch block address. Therefore, the "predetermined condition" could either be considered to be satisfied or failed in the case when zero branches are identified in a fetch block.

Figure 6:
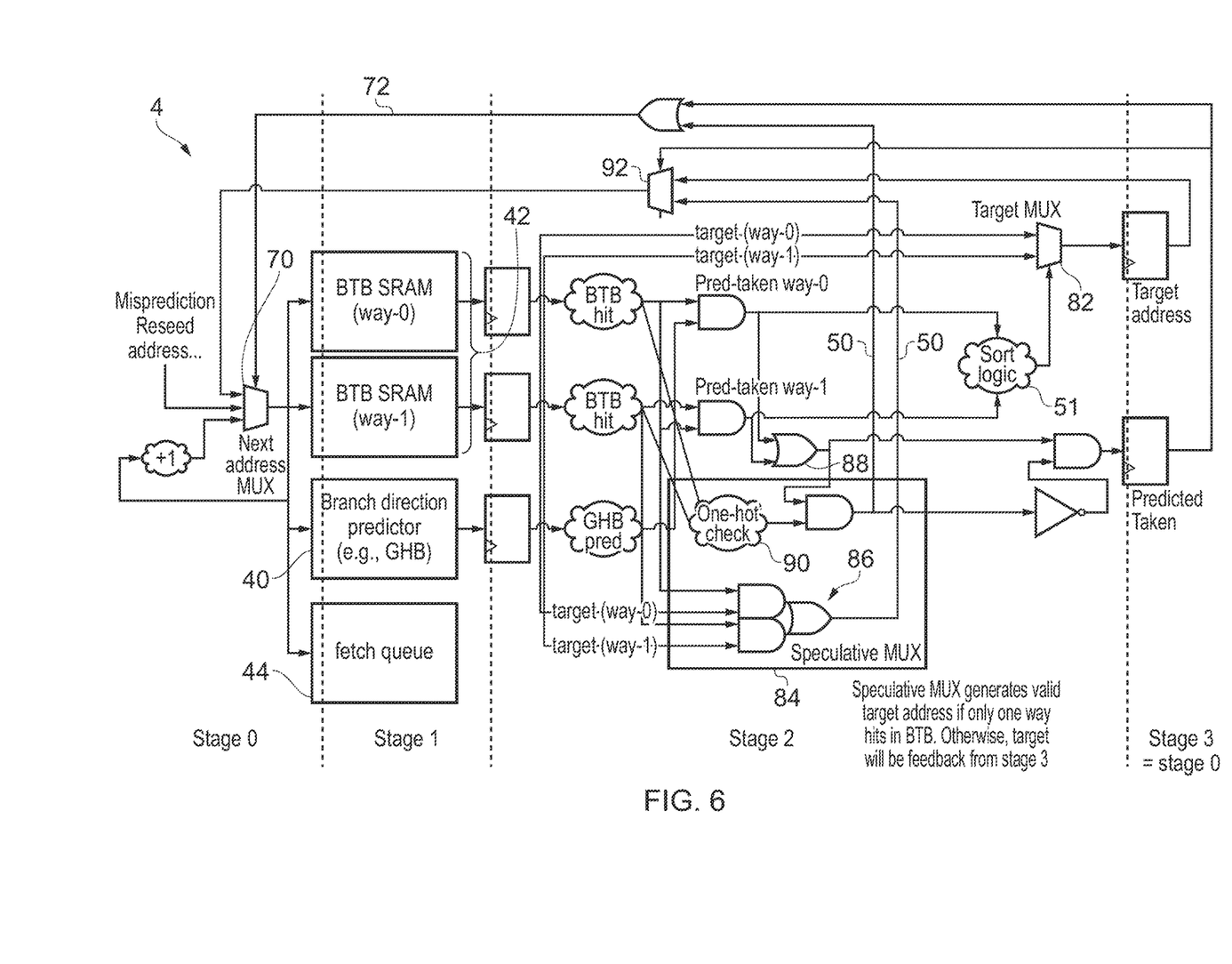
FIG. 6 illustrates the branch predictor in more detail.
Figure 7:
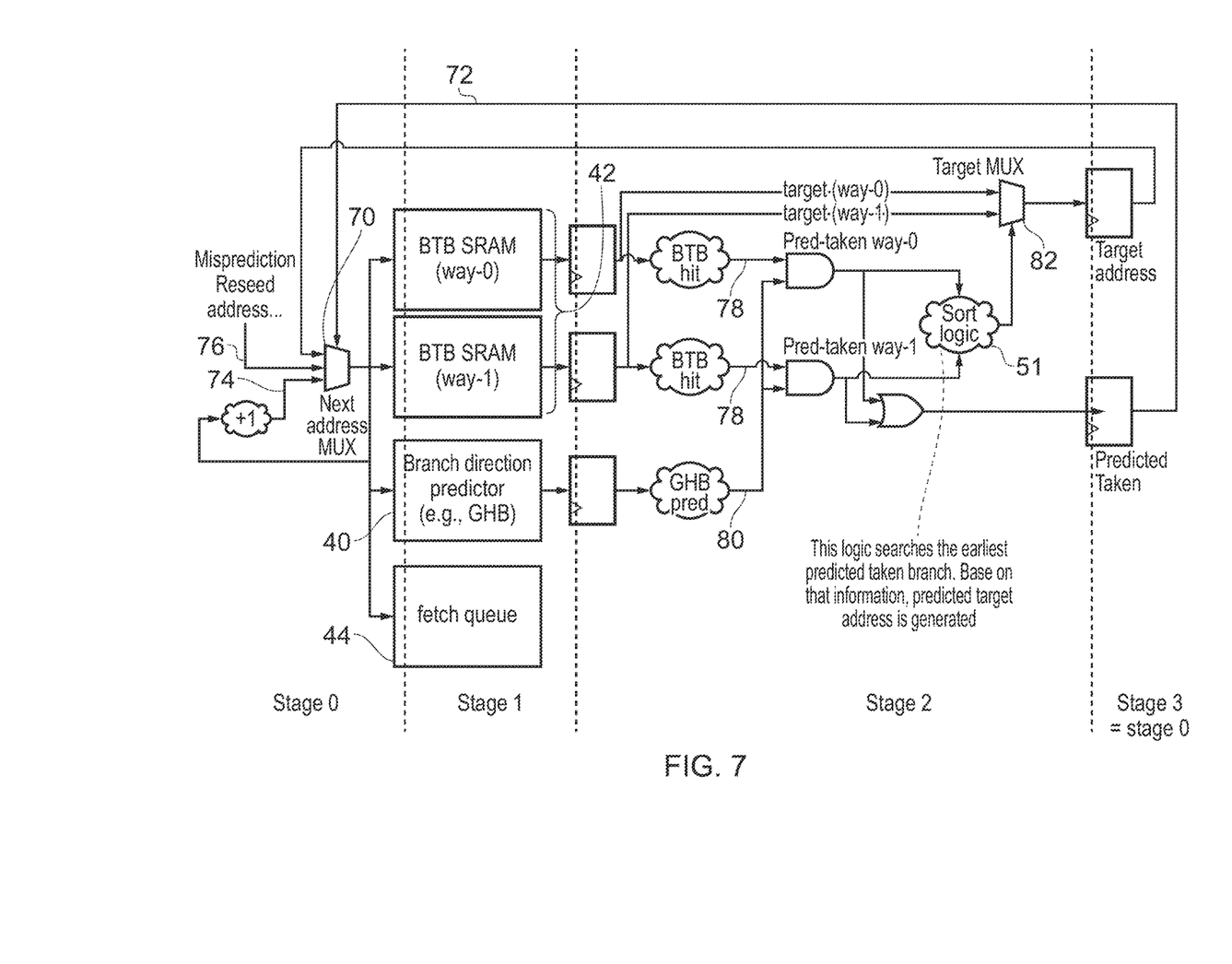
FIG. 7 is a simplified version of FIG. 6 for explaining the branch target selecting circuitry.

FIG. 6 shows the branch predictor 4 in more detail. FIG. 6 shows the branch predictor 4 including the shortcut path 50 and associated control logic. However, for ease of explanation the branch target selecting circuitry 51 is first explained with reference to FIG. 7, which shows a simplified version of FIG. 6 omitting the portions relating to the shortcut path. As shown in FIG. 7, in the first stage (stage 0), the next fetching address is detected and used to setup the read of the SRAM 72 in the next stage of the branch prediction pipeline (e.g. the setup operations may include extracting/generating the index 45 for indexing into the BTB SRAM 42). A next address multiplexer 70 selects the next fetching address from among several options:

the predicted target address received over path 72 from the BTB 42, which is selected in the event that a predicted taken branch was identified for the previous fetch block;

an address 74 obtained by incrementing the previous fetch block address, which is selected in the event that no predicted taken branches are identified for the previous fetch block; and a reseed address 76 supplied from a later stage of the pipeline, which is selected in the event of a branch misprediction, when the address from which fetching is restarted is determined based on the actual outcome of a given branch which was found to be different from the prediction made by the branch predictor.

In a second stage (stage 1), the BTB SRAM access is performed and the read values are latched in the pipeline registers. Also, the fetch block address is used to lookup the branch direction predictor 40 in parallel with the BTB 42. Also, the fetch block address is supplied to the fetch queue 44, to await fetching of the corresponding block of instructions from the instruction cache 6.

In a third stage (stage 2), the target address prediction is generated. This operation is performed by the following steps:

(1) detecting whether there was a BTB hit for each way of the BTB, and qualifying its direction (taken/not-taken) using the BDP 40. This is done by combining the hit signals 78 from each way with corresponding branch taken prediction 80 from the BDP.

(2) determining which of the branches for which a hit is detected is the earliest predicted taken branch using sort logic 51 (corresponding to the branch target address selecting circuitry mentioned earlier). The sort logic 51 for example compares the offsets 47 read from the BTB for each of the predicted taken branches to determine which comes earliest. The sort logic 51 controls a target multiplexer (target MUX) 82 to select the target address associated with the earliest predicted taken branch. The pipeline cannot start operation (2) before operation (1) is completed. This dependency chain becomes the critical path for the branch prediction datapath, which makes it hard to perform this operation in one cycle for many high-frequency superscalar processors.

FIG. 6 shows all of the elements included in FIG. 7, as well as the components relating to the shortcut path 50. In this datapath, a speculative MUX 84 is added in addition to the target MUX 82 shown in FIG. 7. The speculative 84 comprises an AND-OR tree 86. The AND gates are opened when the corresponding BTB way is hit in its tag comparison and output the corresponding predicted target address when open (no sorting is performed based on which address relates to the earliest taken branch). The results of the AND gates are ORed to calculate the next fetch block address to be output over the shortcut path 50. When multiple branches hit in BTB, the output value becomes corrupted, but, if only one branch hits in the BTB, the speculative MUX 84 outputs the same value as the predicted target which would be obtained using the target MUX 82. The predicted taken information is also generated in parallel and reduced by an OR-tree 88. As a the variation of this datapath, this AND condition can be mitigated by partial hit (e.g., compare only a few bit in BTB tag instead of full tag compare) to reduce logic depth.

The speculatively selected target information is qualified by one-hot check logic 90 which detects whether a one-hot condition is met (when only one of the BTB ways generates a hit). When the one-hot condition is met, the speculative target is the same as the final target. When the one-hot condition is not met, the speculative target value can be different from final target (thus, it is discarded). When the one-hot check is violated, the normal branch prediction path is activated. When the one-hot check passes, the normal branch prediction mux path is disabled and the speculative mux is enabled. While FIG. 6 for conciseness shows an example with a two-way BTB, it will be appreciated that a similar technique could be used for a BTB with greater associativity, in which case the AND-OR tree 86 and OR tree 88 may require a more complex tree than shown in FIG. 6 (e.g. multiple levels of gates in the tree to combine the inputs for 3 or more ways).

FIG. 6 shows a simple example where the onehot checking circuitry determines whether the condition for using the shortcut path 50 is satisfied solely based on the onehot checking. However, other factors may also be considered in determining whether the shortcut path 50 can be used.

Figure 8:
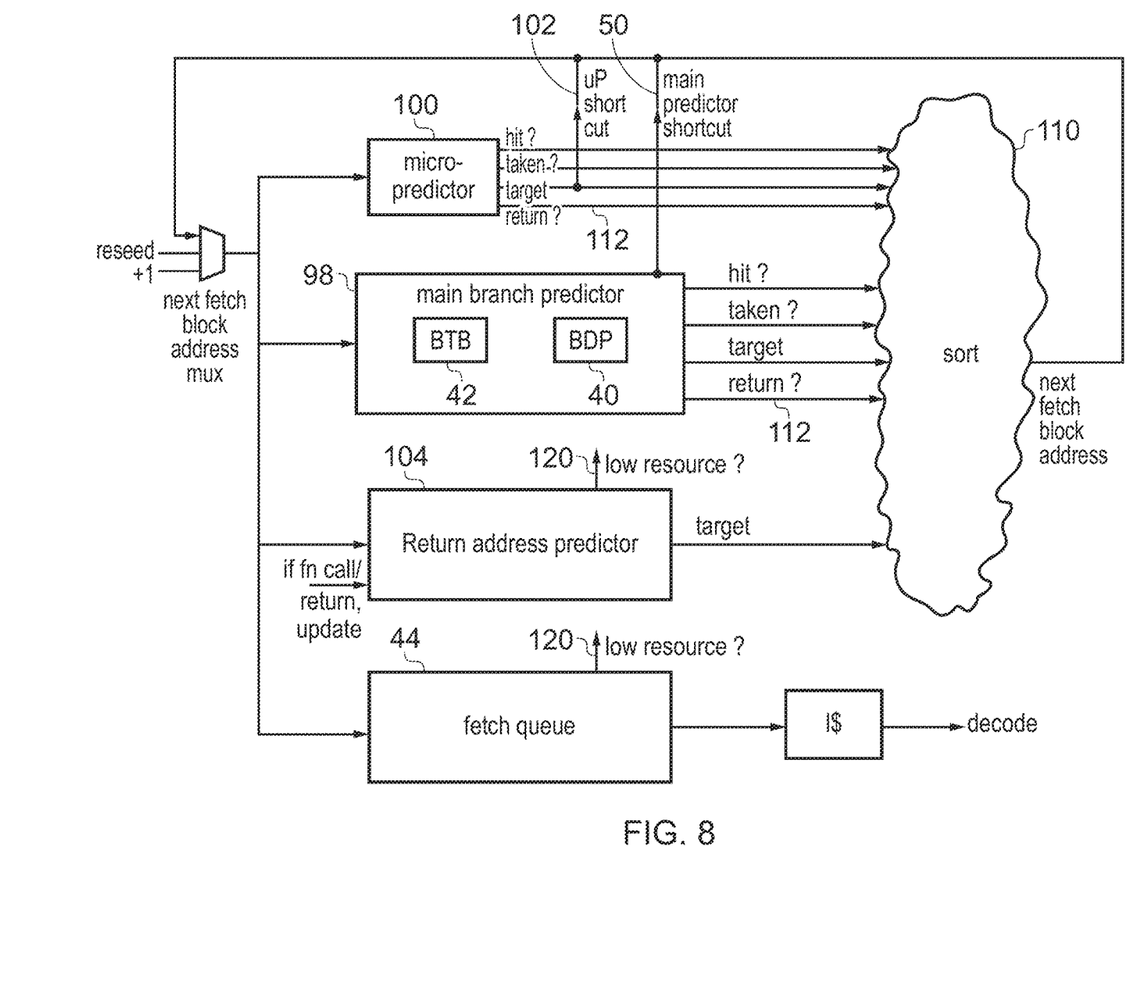
FIG. 8 illustrates use of the branch predictor alongside other branch prediction resources.

For example as shown in FIG. 8, the BTB 42 may not be the only branch prediction mechanism provided for predicting branch target addresses. For example, in addition to a main branch predictor 98 comprising the BTB 42 and BDP 40 as shown above, there could also be provided a micro-predictor 100 for providing a faster prediction of the branch target address for a smaller number of branches. For example, the micro-predictor could use flip-flop based storage circuitry instead of SRAM, or could provide a very small level-0 BTB. Typically, the micro-predictor can provide its prediction with 0 cycle or 1 cycle latency relative to the cycle in which the address is input, but its coverage is low as it cannot store a large amount of branch information. Hence, the micro predictor may, in the cases when an address hits in the micro-predictor provide a faster result over a second shortcut path 102 than is possible using the shortcut path 50 of the main branch predictor 4 as discussed above. Also, a return address predictor 104 may be provided for predicting the return addresses of function calls.

In cases where the fetch address hits in more than one of the branch prediction structures 98, 100, 104, some sorting logic 110 may compare the outcomes from each structure and decide which of the predictions should be used as the next fetch block address. For example, the information stored for each branch in the micro predictor 100 and the main branch predictor 98 may include a return address flag 112 (as shown in FIG. 3) which when set to a predetermined value may indicate that the sorting logic 110 should ignore the predictions for these branches from the main and micro-predictors, and instead use the target address predicted by the return address predictor 104. In the case of hits in both the micro predictor 100 and the main predictor 98, the sorting circuitry 110 may suppress the address predicted by the main predictor and use the micro-predictor's address which would already have been provided by the shortcut 102. In some cases the sorting circuitry 110 may need some time to decide which address to use, and so in such cases the main predictor's shortcut path 50 may not be appropriate. Hence, the control logic in the main predictor 4 may determine that the predetermined condition for using the shortcut path 50 is failed if there has also been a hit in one of the other predictor types such as the micro-predictor 100 or the return address predictor 104.

Also, as shown in FIG. 8, some of the prediction resources, such as the return address predictor 104 or the fetch queue 44, may generate a signal 120 indicating whether resources are running low in those branch prediction structures. For example the low resource signal 120 may be generated when there are fewer than a threshold number of entries remaining for accepting new fetch addresses in the fetch queue 44 or new return address information in the return address predictor 104. The low resource signal 120 may be provided to the main branch predictor 98, and control circuitry within the main branch predictor 98 may prevent the shortcut path 50 being used if resource is low at another branch prediction resource, to give an additional cycle for more resource to become available, reducing the chance of a stall to the branch prediction pipeline caused by the other branch prediction resource.

Another factor to consider when determining whether to use the main predictors shortcut path can be whether the branch associated with a hit in the BTB is a predetermined type of branch for which the shortcut should not be used. For example the branch type indicator 114 shown in FIG. 3 can be used to identify whether a hit branch is of a predetermined type, e.g. a polymorphic branch for which multiple different target addresses have been encountered on previous instances of execution of the branch. When a hit relates to a polymorphic branch, the target indicated in the BTB may be unreliable and the sorting logic 110 may need to perform additional checks to generate a better prediction of the polymorphic branch's target address, such as consulting a separate storage structure which may store more information about the history of addresses used by the polymorphic branch. Again, this may require more time and so to prevent unnecessary fetches being triggered by a potentially unreliable address provided by the shortcut path 50, the BTB may use the full branch target selecting circuitry 51 instead.

The examples above have discussed how to look up the branch prediction structures to identify outcomes of predictive branches, but have not described how to update the information in the branch prediction structures. In general, when a branch instruction reaches the execute stage and its outcome is actually known then the information in the branch predictor is updated to reflect the outcome and make it more likely that a similar outcome will be predicted again the next time the same branch is encountered. Any known technique for updating branch prediction structures can be used in the present technique.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. An apparatus comprising:
a branch target buffer comprising a plurality of ways to store predicted target addresses of branch instructions, wherein in response to a fetch block address identifying a fetch block comprising a plurality of program instructions, the branch target buffer is configured to perform a lookup to identify whether the branch target buffer stores one or more predicted target addresses for one or more branch instructions in said fetch block;
branch target sorting circuitry to compare, when the plurality of ways of the branch target buffer are identified in the lookup as storing a plurality of predicted target addresses for a plurality of branch instructions in said fetch block, offsets of the plurality of predicted target addresses to determine which of the plurality of predicted target addresses stored in the ways of the branch target buffer is for an earliest predicted taken branch instruction in the block, and to select as a next fetch block address, the predicted target address for the earliest predicted taken branch instruction;
a shortcut path bypassing the branch target sorting circuitry, to forward a predicted target address stored in one of said plurality of ways of the branch target buffer as said next fetch block address; and
control circuitry comprising onehot detection circuitry to detect whether the branch target buffer is identified in the lookup as storing the predicted target address for only one branch instruction in said fetch block, and to select as the next fetch block address:
the predicted target address forwarded over said shortcut path when the onehot detection circuitry detects that the branch target buffer is identified in the lookup as storing the predicted target address for only one branch instruction in said fetch block; and
the next fetch block address selected by the branch target sorting circuitry when the onehot detection circuitry detects that the branch target buffer is identified in the lookup as storing a plurality of predicted target addresses for a plurality of branch instructions in said fetch block.

2. The apparatus according to claim 1, wherein the branch target buffer has an N-way set-associative structure and is configured to look up N ways of storage circuitry in dependence on the fetch block address to identify predicted target addresses for up to N branch instructions within the fetch block, where N≥2.

3. The apparatus according to claim 1, wherein the control circuitry is configured to determine that a predetermined condition is failed in a case other than when the branch target buffer is identified as storing only one predicted target address for said fetch block.

4. The apparatus according to claim 1, wherein the control circuitry is configured to select the next fetch block address selected by the branch target sorting circuitry when a predetermined condition is failed, and to determine that said predetermined condition is failed when a spare capacity of at least one branch prediction resource is less than or equal to a threshold amount.

5. The apparatus according to claim 4, wherein said branch prediction resource comprises a fetch queue comprising a plurality of entries to queue fetch addresses of program instructions to be fetched from an instruction cache.

6. The apparatus according to claim 4, wherein said branch prediction resource comprises a return address predictor to predict function return addresses.

7. The apparatus according to claim 1, wherein the control circuitry is configured to select the next fetch block address selected by the branch target sorting circuitry when a predetermined condition is failed, and to determine that said predetermined condition is failed when the branch target buffer is identified in the lookup as storing a predicted target address for a predetermined type of branch instruction in said fetch block.

8. The apparatus according to claim 7, wherein the branch target buffer is configured to store, in association with each predicted target address, type identifying information identifying whether the corresponding branch instruction is said predetermined type of branch instruction.

9. The apparatus according to claim 7, wherein the predetermined type of branch instruction comprises a polymorphic branch instruction for which a plurality of different branch target addresses have previously been identified.

10. The apparatus according to claim 1, wherein the control circuitry is configured to select the next fetch block address selected by the branch target sorting circuitry when a predetermined condition is failed, and to determine that said predetermined condition is failed when at least one further branch target predictor provides a predicted target address in response to said fetch block address.

11. The apparatus according to claim 10, wherein said further branch target predictor comprises a micro-predictor to provide a faster prediction of the predicted target address than said branch target buffer, wherein the micro-predictor is configured to provide predicted target addresses for fewer branch instructions than said branch target buffer.

12. The apparatus according to claim 1, wherein the branch target buffer is configured to perform a next lookup of the branch target buffer at least one processing cycle earlier when athe predetermined condition is satisfied than when the predetermined condition is failed.

13. The apparatus according to claim 12, wherein the branch target buffer is configured to speculatively perform a next lookup using the next fetch block address provided by the shortcut path before the control circuitry has determined whether the predetermined condition was satisfied in the previous lookup.

14. The apparatus according to claim 13, wherein the control circuitry is configured to control the branch target buffer to restart the next lookup using the next fetch block address provided by the branch target sorting circuitry when it is determined that the predetermined condition was failed in the previous lookup.

15. The apparatus according to claim 1, wherein the shortcut path comprises:
   a plurality of AND gates to AND each predicted target address identified by the branch target buffer in the lookup with a respective taken signal indicating whether the corresponding branch instruction is predicted taken; and
   one or more OR gates to combine outputs of said plurality of AND gates in a logical OR operation;
   wherein the shortcut path is configured to forward an output of said one or more OR gates as said next fetch block address.

16. A method comprising:
   in response to a fetch block address identifying a fetch block comprising a plurality of program instructions, looking up a branch target buffer comprising a plurality of ways to identify whether the branch target buffer stores one or more predicted target addresses for one or more branch instructions in said fetch block;
   when the plurality of ways of the branch target buffer are identified in the lookup as storing a plurality of predicted target addresses for a plurality of branch instructions in said fetch block, comparing offsets of the plurality of predicted target addresses to determine which of the plurality of predicted target addresses stored in the ways of the branch target buffer is for an earliest predicted taken branch instruction in the block, and selecting as a next fetch block address, the predicted target address for the earliest predicted taken branch instruction;
   determining whether the branch target buffer is identified as storing only one predicted target address for said fetch block;
   detecting whether the branch target buffer is identified in the lookup as storing the predicted target address for only one branch instruction in said fetch block; and
   selecting as the next fetch block address:
      the predicted target address stored in one of said plurality of ways of the branch target buffer and forwarded over a shortcut path bypassing said comparing, when the
   detecting detects that the branch target buffer is identified in the lookup as storing the
   predicted target address for only one branch instruction in said fetch block; and
   the next fetch block address selected as the predicted target address for the earliest predicted taken branch instruction by said selecting, when the detecting detects that the branch target buffer is identified in the lookup as storing the predicted target address for a plurality of predicted target addresses for a plurality branch instructions in said fetch block.

17. An apparatus comprising:
   means for storing predicted target addresses of branch instructions comprising a plurality of ways, wherein in response to a fetch block address identifying a fetch block comprising a plurality of program instructions, the means for storing is configured to perform a lookup to identify whether the means for storing stores one or more predicted target addresses for one or more branch instructions in said fetch block;
   means for sorting to compare, when the plurality of ways of the means for storing are identified in the lookup as storing a plurality of predicted target addresses for a plurality of branch instructions in said fetch block, offsets of the plurality of predicted target addresses to determine which of the plurality of predicted target addresses stored in the ways of the means for storing is for an earliest predicted taken branch instruction in the block, and to select as a next fetch block address, the predicted target address for the earliest predicted taken branch instruction;
   means for bypassing the means for sorting, to forward a predicted target address stored in one of the ways of the means for storing as said next fetch block address; and
   means for controlling comprising means for onehot detection to detect whether the means for storing is identified in the lookup as storing the predicted target address for only one branch instruction in said fetch block, and to select as the next fetch block address:
      the predicted target address forwarded over said means for bypassing when the means for onehot detection detects that the means for storing is identified in the lookup as storing the predicted target address for only one branch instructions in said fetch block; and
      the next fetch block address selected by the means for sorting when the means for onehot detection detects that the means for storing is identified in the lookup as storing a plurality of predicted target addresses for a plurality of branch instructions in said fetch block.

* * * * *